United States Patent
Dutta et al.

(10) Patent No.: US 7,076,495 B2
(45) Date of Patent: *Jul. 11, 2006

(54) BROWSER REWIND AND REPLAY FEATURE FOR TRANSIENT MESSAGES BY PERIODICALLY CAPTURING SCREEN IMAGES

(75) Inventors: Rabindranath Dutta, Austin, TX (US); Michael Richard Cooper, Austin, TX (US); Kamal Chandrakant Patel, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 681 days.

This patent is subject to a terminal disclaimer.

(21) Appl. No.: 09/843,063

(22) Filed: Apr. 26, 2001

(65) Prior Publication Data

US 2002/0161794 A1  Oct. 31, 2002

(51) Int. Cl.
*G06F 17/30* (2006.01)

(52) U.S. Cl. .................. 707/102; 707/10; 709/203; 709/219; 345/156

(58) Field of Classification Search ................ 707/10, 707/102, 1, 104.1; 709/203, 219; 345/156, 345/418, 723, 762; 705/1
See application file for complete search history.

(56) References Cited

U.S. PATENT DOCUMENTS

| 5,572,643 | A  |    | 11/1996 | Judson ......................... 709/224 |
| 5,708,825 | A  |    | 1/1998  | Sotomayor ............... 715/501.1 |
| 5,737,619 | A  |    | 4/1998  | Judson ........................ 715/513 |
| 5,745,360 | A  |    | 4/1998  | Leone et al. ................ 715/513 |
| 5,761,683 | A  |    | 6/1998  | Logan et al. ............... 715/500 |
| 6,005,564 | A  | *  | 12/1999 | Ahmad et al. .............. 345/723 |
| 6,014,183 | A  | *  | 1/2000  | Hoang ........................ 348/700 |
| 6,018,748 | A  |    | 1/2000  | Smith ...................... 715/501.1 |
| 6,021,435 | A  |    | 2/2000  | Nielsen ...................... 709/218 |
| 6,295,092 | B1 | *  | 9/2001  | Hullinger et al. ........... 348/468 |
| 6,317,141 | B1 | *  | 11/2001 | Pavley et al. ............... 715/732 |
| 6,412,013 | B1 | *  | 6/2002  | Parthasarathy et al. ..... 709/235 |
| 6,446,119 | B1 | *  | 9/2002  | Olah et al. .................. 709/224 |
| 6,583,813 | B1 | *  | 6/2003  | Enright et al. .............. 348/150 |
| 6,667,751 | B1 | *  | 12/2003 | Wynn et al. ................. 345/833 |
| 2001/0039546 | A1 | * | 11/2001 | Moore et al. ................. 707/10 |
| 2002/0000984 | A1 | * | 1/2002  | Asai et al. .................. 345/211 |
| 2002/0056098 | A1 | * | 5/2002  | White ......................... 725/39 |

(Continued)

OTHER PUBLICATIONS

Tom Pixley, Document Object Model (DOM) Level 2 Events Specification, Nov. 13, 2000, http://www.w3.org/TR/2000/REC-DOM-Level-2-Events-20001113/.*

(Continued)

*Primary Examiner*—Leslie Wong

(57) ABSTRACT

In the system, method, and program of the present invention, the browser renders a multimedia object to the screen. The multimedia object may be one or more advertisements having links to one or more advertisers. The browser periodically captures screen images having the multimedia object. In one embodiment, the screen images are captured at configurable time intervals. In another embodiment, the screen images are captured when there is a change in content of a screen image. Each screen capture contains the necessary link(s) to access the advertiser. The screen captures are stored, during a configurable duration of time, in a chronological list. A user can replay at a later time some or all of the stored screen images that were captured. The user will have various identifiable snapshots of the advertisements and access to the necessary links to get back to a desired advertiser.

6 Claims, 6 Drawing Sheets

U.S. PATENT DOCUMENTS

2002/0111972 A1*  8/2002  Lynch et al. ................. 707/523
2003/0037158 A1*  2/2003  Yano et al. .................. 709/232
2004/0024640 A1*  2/2004  Engle et al. ................... 705/14

OTHER PUBLICATIONS

Van Name, Mark L.; Catchings, Bill; "Using PCs from afar with connectivity software"; PC Week, v4, n22, pC21 (5); Jun. 2, 1987.*

U.S. Appl. No. 09/561,181, filed Apr. 27, 2000, USA, Method, System, and Program for Saving Object Content in a Repository File, 22 pages, R. Dutta.

Document Object Model (DOM) Level 2 Core Specification, 4 pages, http://www.w3.org/TR/DOM-Level-2-Core/.

Document Object Model (DOM), 4 pages, http://www.w3.org/DOM/.

Banner Console, 5 pages (page 1 repeated to show banner), http://www.i-lor.com/bannerconsole/index.shtml.

* cited by examiner

BROWSER REWIND AND REPLAY FEATURE FOR TRANSIENT MESSAGES BY PERIODICALLY CAPTURING SCREEN IMAGES

BACKGROUND OF THE INVENTION

1. Field of the Invention

This invention relates to displaying content retrieved from a server in a computer network by a user using a browser application on a client device, and more specifically to a system, method, and program for enabling transitory content that has been dynamically displayed within the browser to be redisplayed to the user at the user's command.

2. Description of the Related Art

The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

A Web browser on the client enables a user to specify a Web location through a displayed link or by inputting the URL of the location. The Web browser sends the URL request using the HTTP protocol which defines the way in which the Web browser and the Web server communicate with one another. The request is sent to the Internet which determines which server to send the request to. A Web server receives the request using the HTTP protocol; and sends the requested home page, document, or object to the Web browser client. The content is displayed on the client's computer screen through the Web browser.

In some situations, the requested content will contain other embedded objects that are specified by a different URL. These other objects may be located at a different server than the server at which the originally requested content resides. After receiving the originally requested content and a URL of an embedded object, the Web browser sends out a request to the Internet for this other object. The Web browser then embeds this other object/content into the original document as specified by the HTML tags in the original document.

When a user is browsing or accessing Web pages, the Web browser itself, and/or the Web pages being accessed, may include advertisements, or promotional or informational messages. The words "banner advertisements" or "messages" or "ads" will be used interchangeably herein to refer to these advertisements or messages. Typically, banner advertisements are displayed in some portion of the browser or in a separate window other than the window displaying the requested content. An Internet Service Provider (ISP) or On Line Service may cause banner advertisements to be displayed on the client's Web browser independently of any specific content or Web page being accessed. That is, the messages are not associated with or dictated by the content being displayed and thus appear to be randomly generated.

Advertisements can also appear within a given portion of a Web page. Owner's of Web pages may sell banner space within their Web page to advertisers to generate revenue. Owner's of Web pages may also utilize their own advertising. Also, owners of search engines generate revenue by displaying banner advertisements on their home page and along with any displayed search results. Sometimes the content of the banner advertisements are geared to a targeted audience as made evident by the subject matter being searched or by information that may be accessible in cookies stored at the client.

The HTML structure of Web documents in general enables advertisements or other objects to be embedded within a Web page or document. To take advantage of this feature, some Web sites configure their pages such that there is a consistent area on each page where advertisements are displayed. Web page content is then formatted around these predefined areas. Typically, the predefined area has its own URL which is different than the URL used to get the Web page content. The URL for the predefined area usually retrieves an advertisement from a server especially designed to deliver advertisements. As such, when a first URL is used to request a new page from a given Web site, the URL for the predefined area is used to get an advertisement to be displayed in the predefined area. The advertisement is placed in the same position on the Web page, and the content that was retrieved may be modified to fit around this advertisement area. The advertisement server may provide a different advertisement even though the same URL for the advertisement server is being used. As such, each time the same Web page is accessed, a different advertisement may appear. The displayed messages may appear to be dynamically or randomly generated. As such, these banner advertisements are referred to herein as being dynamically and/or randomly generated. That is, a same advertisement does not necessarily appear each time a same Web page is accessed.

The dynamic and random nature of advertisements can be caused by any one of several factors. For example, the embedded object containing advertisement content may be a multimedia object. Not only is such a multimedia object enabled to contain a sequence of static frames played at a given number of frames per second to give a moving picture affect, but the multimedia object may contain a sequence of different advertisements displayed one after the other. Also, as a user accesses different Web pages, each web page may display different advertisements. Also, for a given URL for an embedded object within a given Web page, a server can be constantly changing the advertisement content associated with the given URL. This enables the server to bring in advertising dollars from as many different advertisers as possible by dispersing advertising time and space for any given highly visited Web site amongst the many different advertisers.

It should be noted that although the term randomly generated is used because the advertisements may be different each time a same page is accessed, they may not be truly randomly generated by the advertisement server. That is, the advertisement server may have a very specific algorithm for determining which advertisement to send depending upon a time of the request, the content being requested, and/or one or more attributes of the requester. In other words, target advertising may be used to gear certain advertising to certain types of users at certain times of the day and for certain types of content being requested. In this respect, the advertising is not randomly generated, but generated pursuant to a specific algorithm. Nevertheless, the term randomly generated or dynamically generated is used interchangeably to mean that the advertisement may change independently of any changed or unchanged Web page content. In other words, different requests for a given URL for a specific Web page will not necessarily result in a same advertisement being displayed within that Web page each time that it is requested and rendered to the display.

As such, if a user "misses" an advertisement, the user may not necessarily be able to just request the same Web page and expect to get back the same advertisement that was previously rendered with a previous rendering of that Web page.

In addition, not only are these advertisements dynamically and randomly generated as discussed above, but these advertisements or messages also appear and disappear very quickly on the display screen. As such, they are also referred to herein as being transient or transitory banner advertisements or messages.

As such, these dynamically generated transient advertisements have an inherent problem as made evident in the situation where a user may be interested in a promotional message at a particular instance. Because these messages appear and disappear rather quickly, by the time a user tries to select a particular promotional message link, the message may have already flashed by as a different message appears. Hence, the user misses the desired links. This can be especially problematic for users having physical or mental disabilities that hinder the user from being able to respond quickly to these transient messages. As discussed above, because of the dynamic and random nature of the advertisements, a user can not just request the original document again and expect to see the same advertisement embedded therein. Consequently, a specific advertiser that the user was initially interested in may have lost a potential customer.

For example, FIG. 1A displays a Web page 100 with a message 101 appearing above the article to enroll in a Merryll Lynch program. FIG. 1B displays the same Web page 100 with a different message 102 appearing above the article to apply for a Yahoo/Visa card. The Yahoo/Visa message in FIG. 1B appears quickly, and thus the Merryll Lynch message in FIG. 1A is missed.

One solution to help users deal with transitory advertisements is called Banner Console by i-LOR; and it is described on the World Wide Web at i-lor.com/bannerconsole. A tool is added to a banner ad that allows the user to click once to enable the user to return to the banner ad later. The banner ad is saved and its image is listed in a separate window for later selection by a user. Multiple ads can be selected. Each ad selected by the user is added to the list of ads in the separate window.

Another solution is provided in copending patent application Ser. No. 09/561,181, filed Apr. 27, 2000, titled "METHOD, SYSTEM AND PROGRAM FOR SAVING OBJECT CONTENT IN A REPOSITORY FILE" and commonly assigned to IBM Corporation in which a displayed advertisement object can be selected by a user and appended to a repository file of similarly selected objects.

A problem with the above solutions, however, is that they require that a user view each ad as it is quickly displayed in order to make the decision of whether or not the user may want to view it later. This distracts the user from the current Web page that was requested by the user. The above solutions also do not solve the problem of a user reading the requested page content and missing an advertisement by not clicking on it.

SUMMARY OF THE INVENTION

It is therefore desirable to enable a user to view, at a later time, transitory advertisements that a user may have missed.

In the system, method, and program of the present invention, the browser renders the multimedia object to the screen. The multimedia object may encompass video, streaming video, audio, animation, and/or a sequence of images including a sequence of images displayed by push techniques from a server, etc. The multimedia object may be one or more advertisements or other transient message. The multimedia object may be embedded within another document and requested through an URL, or it may be received via push or pull techniques from a server. The browser periodically captures screen images of the multimedia object. In one embodiment, the screen images are captured at configurable time intervals. In another embodiment, the screen images are captured when there is a change in content of a screen image. Each screen capture contains the necessary link(s) to access the advertiser.

The screen captures are stored, during a configurable duration of time, in a chronological list. By selecting the advertisement area, such as by a right mouse click, or other predefined user action, a menu appears having the functional selections of stop, play, rewind, forward skip, reverse skip, etc. If a user selects "play", the screen captures are rendered to the screen in chronological order from the beginning of the list or from a current position in the list. If a user selects "rewind", the screen captures are rendered to the screen in reverse chronological order beginning from the last object stored in the list or from a current position in the list. If a user selects "forward skip", a next screen capture in the list becomes a current position. If a user selects "reverse skip" a previous screen capture in the list becomes a current position. Movement through the list can occur through repeated selection of a given skip button. As such, a user can replay at a later time some or all of the stored screen images that were captured. Upon playback the user will only see the stored screen captures. The user will not see the actual replaying of the multimedia objects. Nevertheless, the user will have various identifiable snapshots of the advertisements and access to the necessary links to get back to a desired advertiser.

Another embodiment of the invention is described in a copending patent application having Ser. No. 09/843,059 and filed on even date herewith and commonly assigned, and which is incorporated herein by reference. Instead of capturing the screen images at periodic intervals, the various multimedia objects are saved automatically, without user interaction, when the multimedia objects are initially rendered to the screen. The stored multimedia objects can be replayed upon selection by a user.

An advantage of the embodiments is that a user can replay transitory content that has been missed. A further advantage is that the content can be replayed at a speed that is different than originally rendered. This enables a person with a cognitive disability to replay the content at a slower speed, if desired.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 2:
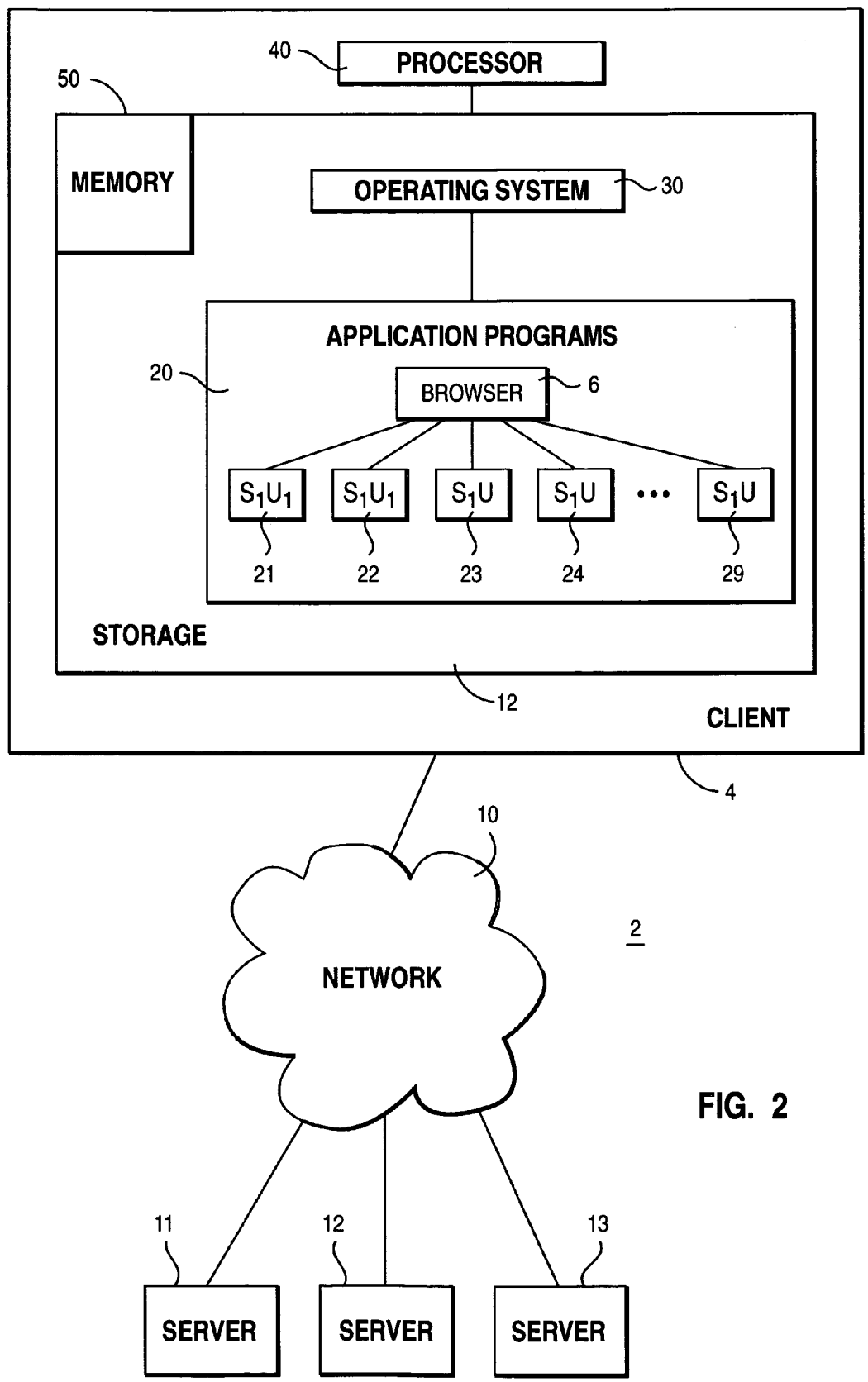
FIG. 2 illustrates a network environment of a preferred embodiment of the invention.

FIG. 2 illustrates a computing environment in which preferred embodiments are implemented. The computing environment 2 includes at least one client computer 4 including a browser program or viewer program 6, such as the Microsoft Explorer or Netscape Navigator, that is capable of retrieving files from servers 11, 12, 13 over a network 10. The client computer 4 may comprise any computer system known in the art capable of executing a browser program. The servers 11, 12, 13 may comprise any computer system known in the art capable of maintaining files and making such files accessible to remote computers. The browser 6 and servers 11, 12, 13 communicate using a document transfer protocol such as the Hypertext Transfer Protocol (HTTP), or any other document transfer protocol known in the art, such as FTP, Gopher, WAIS, etc. The network 10 may be made up of a TCP/IP network, such as the Internet and World Wide Web, or any network system known in the art, e.g., LAN, Ethernet, WAN, System Area Network (SAN), Token Ring, etc.

The client computer 4 may be, but is not limited to, a personal computer, laptop, workstation, mainframe or hand held computer including palmtops, personal digital assistants, smart phones, cellular phones, etc. Client computer includes processor 40 and memory 50. Memory 50 includes volatile or nonvolatile storage and/or any combination thereof. Volatile memory may be any suitable volatile memory device, e.g., RAM, DRAM, SRAM, etc. Nonvolatile memory may include storage space 12, e.g., via the use of hard disk drives, tapes, etc., for data, databases, and programs. The programs in memory include an operating system 30 and application programs 20 including a browser program 6 and software units 21–29 for displaying text and various types of multimedia objects as further discussed below. The browser program 6 displays a graphical user interface in which content from a file downloaded from one of the servers 11, 12, 13, such as a HTML page, is displayed. The browser GUI displays graphical buttons to perform operations related to the files in storage as further described herein.

The client computer 4 includes output devices (not shown) including a display for displaying the browser GUI and Web page and object content. The client computer also includes at least one input device (not shown) through which the user may enter input data to control the operation of the browser program 6, such as a keyboard, mouse, pen-stylus, touch sensitive screen, voice decoder for decoding voice commands, etc. In preferred embodiments, a user at the client computer 4 can input commands to control the browser program 6 through the graphical user interface (GUI) generated by the browser 6 or input device controls, such as keyboard keys, mouse buttons, touch pad regions, that are programmed to cause the browser to perform specific operations.

The exemplary embodiment shown in FIG. 2 is provided solely for the purposes of explaining the preferred embodiments of the invention; and those skilled in the art will recognize that numerous variations are possible, both in form and function.

Figure 3A:
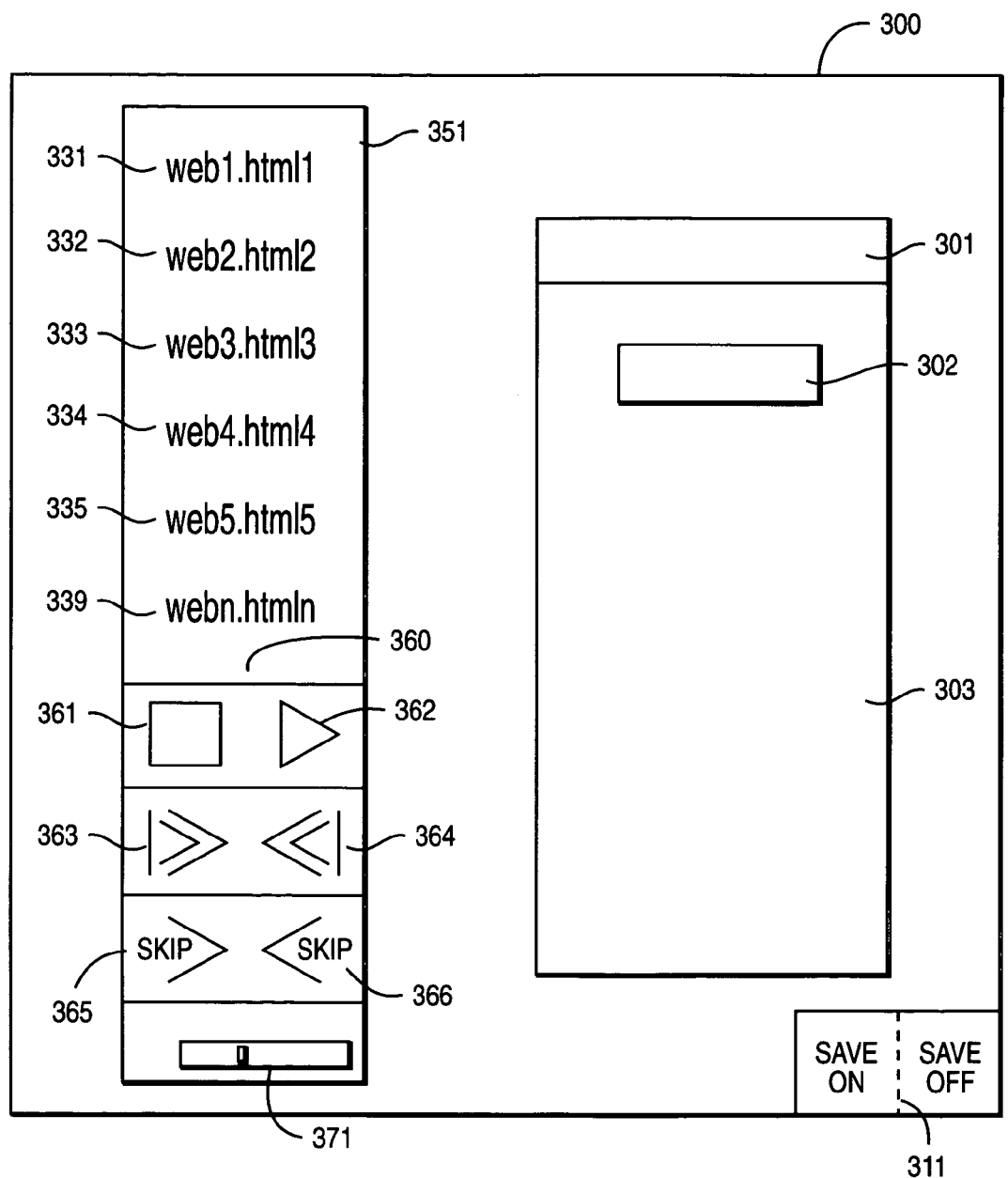
FIG. 3A illustrates an external representation of a browser window displayed to a user and a displayed list of stored screen images.

FIG. 3A illustrates an external representation of a browser window 300 having a URL field 301, a visual multimedia object area 302, and text 303. The object area 302 may support multimedia objects such as images, video, audio, graphics, and text. The software that enables this external representation includes a software unit for the multimedia object display (e.g., any one or more of software units (S.U.) 22–29 shown in FIG. 2), and a software unit (e.g., software unit 21 FIG. 2) for the text display. Each of the software units separately render the content for the visual multimedia object and the text area on the display screen by accessing the content from separate locations within the network.

The visual multimedia object 302 can be of a static image type or a moving picture type, e.g., a video. The moving picture can be constructed by rapidly showing a sequence of static images such as in a movie which may show a series of static frames at a rate of so many frames per second, e.g., 30 frames per second. All of these frames can be sent from a server. This represents how the real audio format MP3, or video format, are currently sent. However, sending so many frames for each second of display is typically an expensive way to send such data. Another way to send such multimedia data is to send a vector graphic program, such as SVG or Macromedia Flash, from a server which is then played by the browser. A third kind of multimedia object is an animated GIF which is a program which has certain characteristics which allows it to be animated by the software unit. Regardless of what type of moving picture is being sent—whether it is a sequence of static images or a program such as SVG, Macromedia Flash, or an animated GIF—it is always interpreted by a software unit for the given multimedia object.

For the display of multimedia objects, a software program is used such as Microsoft Multimedia Player, RealNetworks (Real Audio and Real Video), QuickTime by Apple, etc. In the user interface for such a player, a user would input a filename of the moving picture and the program would play it in a window. The multimedia program has user interface controls such as a forward button, backward button, fast forward button, fast reverse button, stop, and play, etc. For a given type of multimedia object, operations on the object such as play, rewind, etc., are known in the art. It should be noted that any given media player can only play the certain media types of files that it can interpret.

In operation, a Web browser issues a get command (e.g., GET X.HTML) to get back the document named X.HTML. The browser interprets the document, X.HTML, and determines that it includes a multimedia object (e.g., a multimedia object named obj1.xx where xx is the extension name which may be dependent on the type of multimedia object, e.g., .GIF for a GIF object type). The browser then issues a GET for the multimedia object (e.g., GET obj1.xx) to get the object. The Web browser now has the document X.HTML and the multimedia object obj1.xx. The Web browser renders both of them on the screen using the software unit for text to render X.HTML and the appropriate software unit for rendering the multimedia object obj1.xx depending upon the type of multimedia object (e.g., GIF, .MP3, .JPG, AU, .AVI, etc.). To accomplish this, the browser examines the extension of the multimedia object to determine which software unit is needed, e.g., a GIF renderer, or a .MP3 renderer, etc., to run the multimedia object through to render it. The client has the renderers, i.e., software units, needed to interpret and render most types of multimedia objects.

As previously discussed, a given multimedia object may only be rendered for a relatively short period of time, thereby appearing to the user as transient content. For example, the user may request a new Web page that has a different multimedia object embedded within or no multimedia object at all, such that any multimedia object previously rendered goes away when the new page is rendered. In addition, a given multimedia object may be comprised of a succession of different content so that it appears to the user that different multimedia objects are being rendered in succession.

In order to assist the user in being able to view at a later time transient content contained in a multimedia object, whether it is embedded within a Web page and referenced through an URL or received via push or pull techniques from a server, a preferred embodiment of the system, method, and program of the present invention enables a Web browser to capture screen images, at a configurable time interval, of the displayed documents and/or any embedded multimedia objects. These captured screen images are stored in a chronological list, and can be later rendered to the screen in succession at a rate determined by a user.

Figure 1A:
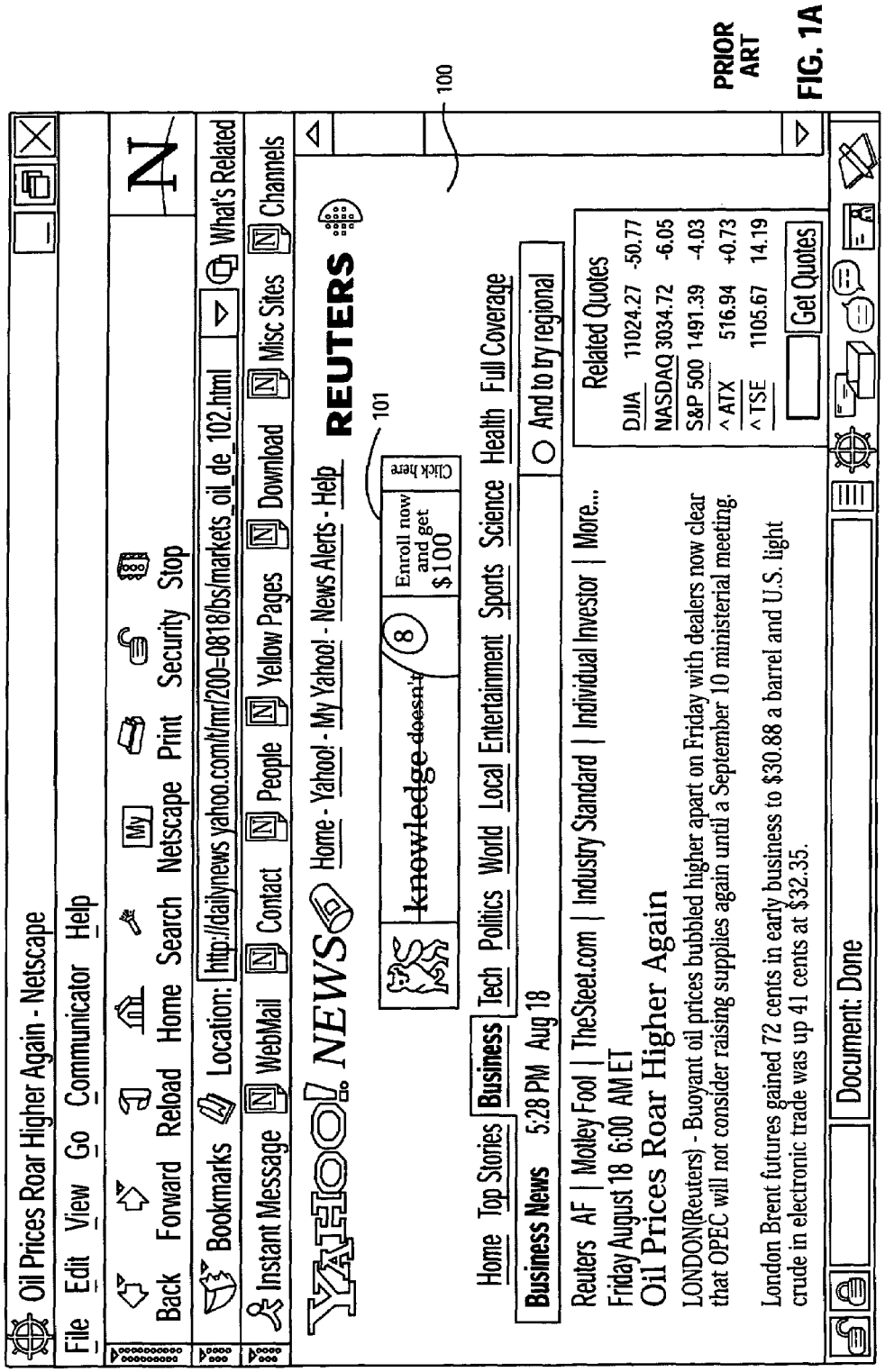
FIGS. 1A and 1B are examples of transitory messages dynamically displayed in a Web browser as known in the art.
Figure 1B:
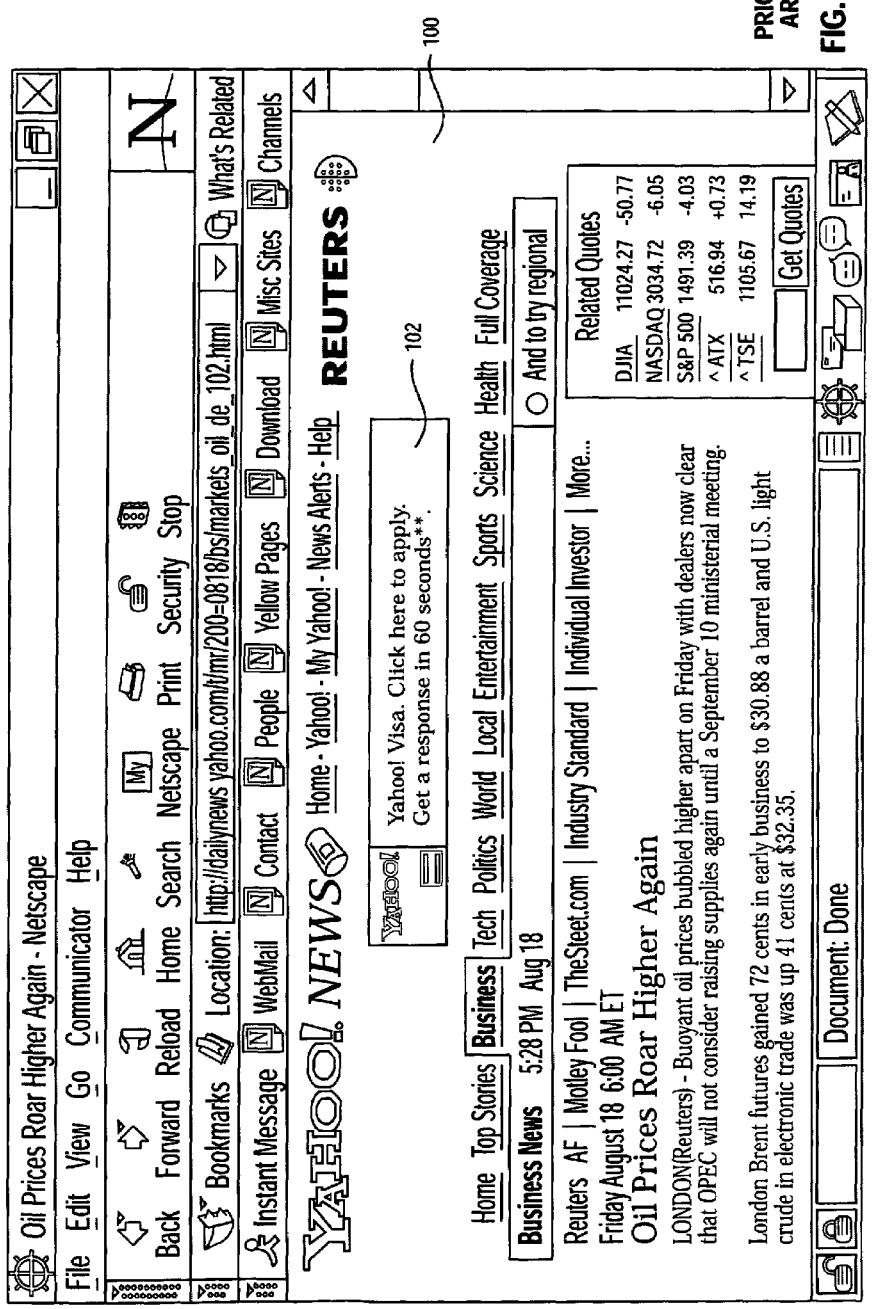

More specifically, the Web browser saves a screen capture, i.e., a screen bitmap, at periodic intervals. The browser determines a shortest time interval that the content in the object area changes. This could take into account the change in content for a same Web page as shown in FIGS. 1A and B such as by a same multimedia object having a sequence of different promotional ads; or it could take into account the rate at which new pages with different multimedia objects have been rendered to the screen. It does not necessarily take into account changes from frame to frame of a moving picture within a same advertisement. This embodiment takes static snapshots of such moving pictures at configurable intervals. Although upon playback the user will not see the actual replaying of the multimedia object, the user will have various identifiable snapshots of the advertisements and access to the necessary links to get back to a desired advertiser.

For example, when a first screen capture is made, it would be saved as a document, e.g., web1.html1. Any HTTP links pointing to the advertiser's site are contained in the web1.html1 document and can be accessed when this page is rendered in the browser in response to a selection of the rewind and replay feature. At a time interval t2, the user may see promotional message m2. The Web browser saves the screen capture for the static frame 2 of the document at time t2 as web2.html2. Any HTTP links pointing to the second advertiser's site are contained in the web2.html2 screen capture document and can be accessed when this page is rendered in the browser as a result of a selection of the rewind and replay feature of this invention. Likewise, screen captures (html3, html4 . . . htmln) are saved locally for subsequent static frames at certain time intervals. The time intervals may be every second, every three seconds, etc., depending upon user preference. The total amount of time (y) is indicated from the beginning time to the ending time for saving HTML files.

Referring again to FIG. 3A, when the feature to save the captured screen images is set on, such as through a special control or button 311 in the browser GUI or through a pull down menu in the browser GUI, the browser automatically captures and stores the screen images without a user first having to select each object to be stored. The time interval between successive screen captures can be configured initially via a default time or later changed or set by the user. The user can also set the duration manually by selecting or deselecting control 311. The succession of captured screen images 331–339 are stored in a list 351 in memory preferably at the client. The names of the captured screen images are stored in chronological order with respect to a time in which they were captured. For some embodiments, the time captured may also be displayed with or without the name of the captured screen image. Furthermore, in addition to, or in place of, the screen image name in the list, the list may contain a thumbnail of the screen image, i.e., a small region showing a static frame of the captured screen image.

The list 351 is displayed when the multimedia region 302 of the browser is selected by the user such as through a mouse click. Upon a selection by the user of a screen image within the list, the browser will render again the selected screen image from local memory. The displayed list 351 also displays playback controls 360 such as stop 361, play 362, fast forward 363, rewind 364 and forward skip 365 or reverse skip 366. For instance, if play 362 is selected, the browser renders the first screen image 331 in the list. If the "play" button 362 is still selected, the browser renders the next screen image in the list 332. If the user selects stop, no further screen images from the list are displayed. If the user selects the forward skip button 365 once, then the next screen image in the list, web3.html3 333, is highlighted and displayed. If the user selects the skip forward button 365 repeatedly two more times, then web5.html5 would be highlighted and automatically displayed. If rewind 364 is selected, then the previous object in the list from the current position is displayed. If the rewind button 364 continues to be selected, then each of the screen images 333–331 will be successively highlighted and displayed until either the first screen image 331 in the list has been displayed or the stop button 361 is selected, in which case the object which was highlighted when the stop button 361 was selected will remain highlighted and become the current position. Through the use of the playback controls 360, a user is able to manipulate the playing back of the stored captured screen images at a rate as desired by a user, including a slower rate which would be desirable for users having cognitive disabilities. For example, a sliding bar control 371 can be set by a user to indicate a speed at which successive screen images are displayed.

As such, the browser maintains a list of all of the screen images that have been captured within a configurable duration of time, and the time that the screen image was captured. The browser stores this list of screen images in storage that is preferably local to the browser. Depending upon the size of local storage available at the client, local storage should be adequate for several minutes of saved screen images. If not, or if a longer time is specified, the browser may utilized storage using a communication link to other devices. In this situation, where the dynamic image is not in cache, a selection of the replay feature by a user would cause an HTTP request to be sent to the server, and the appropriate image(s) would be downloaded from the server when they are replayed.

An embodiment of the present invention is further described with the following scenario used as an example.

On a client system starting at 5:00 p.m., a total of five HTML files were saved every two minutes with the end time of 5:10 p.m. For this example, the current time on the system is 6:00 p.m. when the rewind button is clicked once. Upon selection of the rewind button, the HTML file saved at 5:10 p.m. gets loaded into the browser. The subsequent single clicks on the rewind button will display the HTML files that were saved at 5:08 p.m., 5:06 p.m. . . . , etc. When the last saved HTML file at 5:00 p.m. gets displayed, the rewind button gets grayed out which is an indication that there are no further saved links that can be displayed. The missed links or messages can also be displayed in a different browser window or a popup.

Figure 3B:
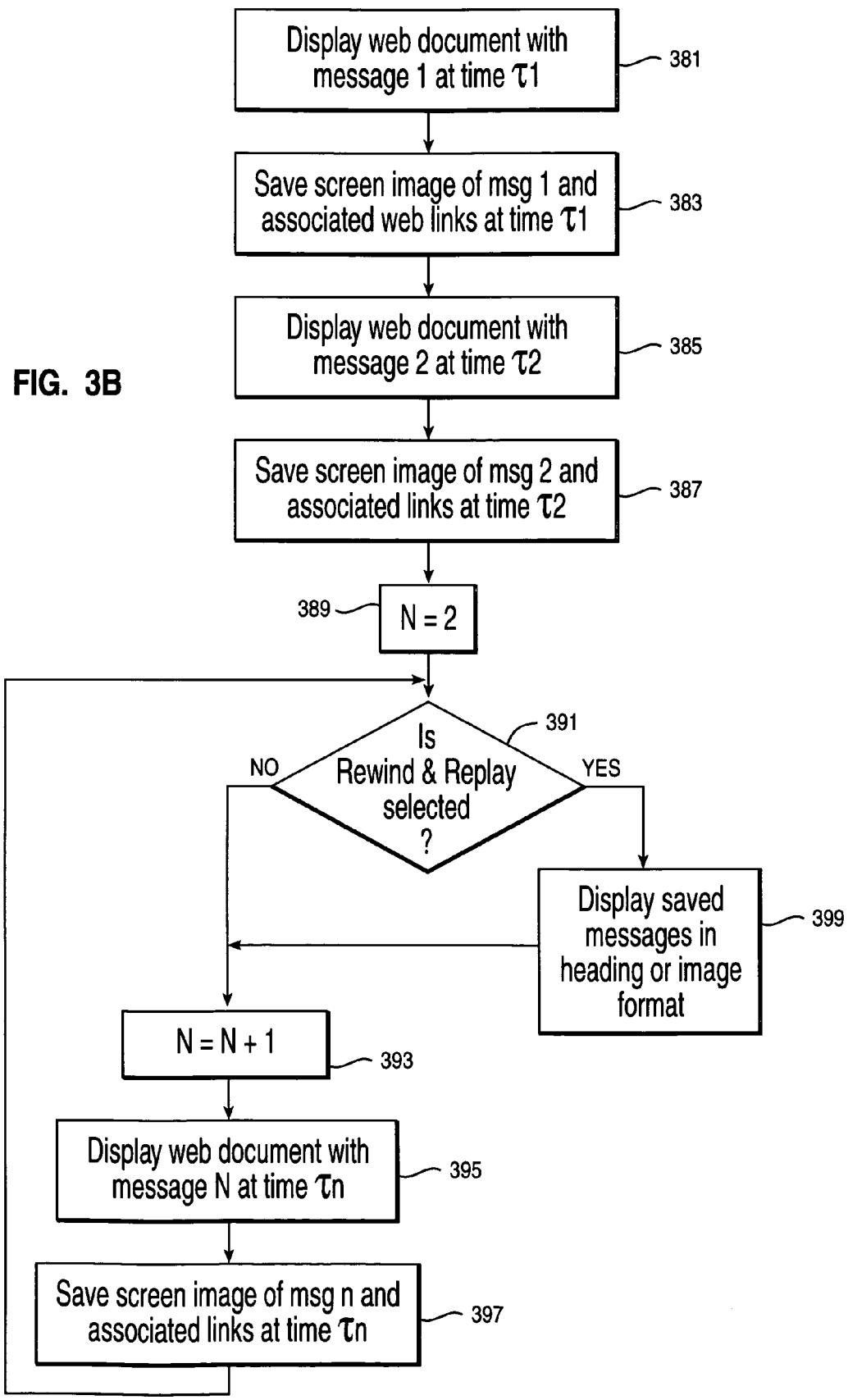
FIG. 3B illustrates the logic utilized in an embodiment that captures screen images at configurable time intervals.

FIG. 3B illustrates the logic utilized in an embodiment of the invention that captures the screen images at configurable time intervals. The Web browser displays a Web document, that has been requested by a user, while displaying message 1 at time t1, 381. The Web browser saves the screen image of message 1 and the associated links as displayed at time t1, 383. While displaying the same or a different Web page, The Web browser displays message 2 at time t2, 385. The Web browser saves the screen image of message 2 and any associated links as displayed at time t2, 387. The number of saved images "n" has the value of 2, 389; and the Web browser determines whether or not a signal is received from the user through a click on a rewind/replay button displayed in the browser, 391. While a signal is not received, a loop is encountered which increments the counter "n", 393, such that the Web browser displays message "n" at time tn, 395; and saves the screen image of each message "n" and any associated Web links at time tn, 397.

If a signal is received from the user, such as via a click on a rewind/replay button, then the Web browser displays the saved messages in a heading or image format, 399. The replayed messages can be displayed in the same browser window, or in a different window, or in a popup. The user can then access the missed message and any of its associated links at a given time frame by selecting from the title list or clicking on the image.

It should be noted that steps 393–397 may be carried out in parallel with step 399 when the rewind/replay button is selected by a user. That is, the transitory messages may continue to be displayed in a portion of the Web browser and saved while another portion of the Web browser replays previously displayed transitory messages.

Figure 3C:
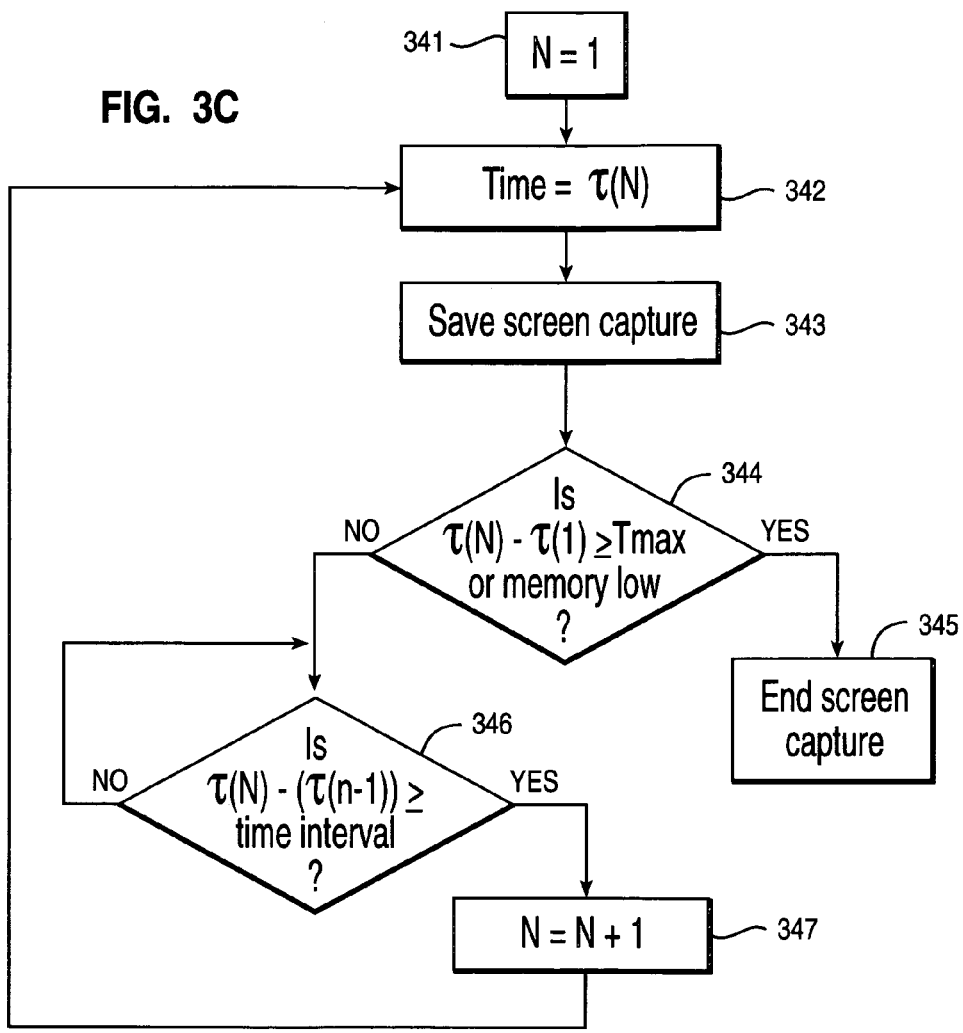
FIG. 3C illustrates alternative logic utilized in an embodiment that captures screen images at configurable time intervals.

FIG. 3C illustrates alternative logic utilized in an embodiment that captures the screen images at configurable time intervals. The Web browser saves the screen capture for the static frame 1 of a document at time t1 as web1.html1, 341, 342, 343. If either the elapsed time is greater than or equal to a configurable maximum time, or the amount of available memory is getting low, 344, then the capturing of screen images ends, 345. If not, then after a configurable time interval elapses, 346, then another screen capture is saved as web2.html2, 347, 342, 343. The process continues until the elapsed time is greater than a configurable amount of time or memory becomes low.

Saving the screen bitmaps every few seconds or so is useful for video stream data or animated GIF files that have a fast motion effect. It is especially beneficial for users having cognitive disabilities who may not be able to comprehend the fast motion presentation. Furthermore, embodiments may contain controls that enable a user to select an automatic playing back of one or more of the stored screen snapshot images at a rate that is comfortable for a user. Alternatively, a user could provide input to step through each captured screen image one at a time as desired by a user. As such, a person with cognitive disabilities can view the missed links at a later time in a way that enhances the user's comprehension of the transient messages.

Figure 4:
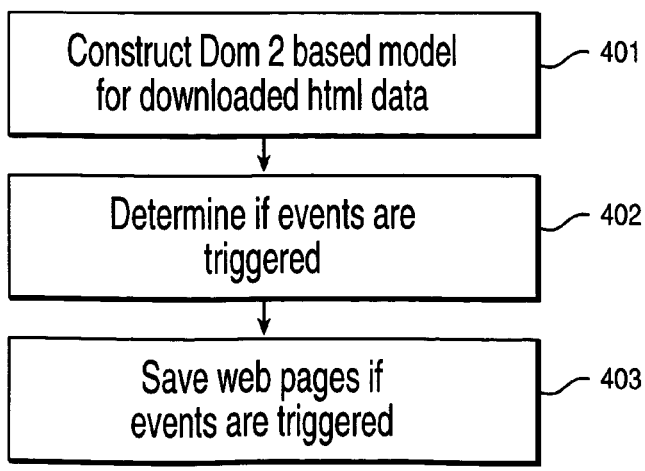
FIG. 4 illustrates the logic for a DOM based embodiment.

In addition to embodiments which save the HTML file corresponding to the screen capture images at specified intervals, a Document Object Model (DOM) based embodiment can be constructed. The logic for a DOM based embodiment is shown in FIG. 4. At least a DOM 2 based model for the downloaded HTML data at the client is constructed, 401. The event-triggering aspects of the DOM 2 model are used to determine when certain events are triggered, 402. The Web pages containing a transient message are saved only when certain events are triggered, 403, such as when a Web page (including any transitory banner advertisement) changes content. An advantage of this preferred embodiment is that it allows for the detection of a change in content as the basis for saving data, as opposed to saving data based on a time interval as required by the previously described embodiment.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as read only memories (ROMs) or erasable, electrically programmable read only memories (EEPROMs), recordable type mediums such as floppy disks, hard disk drives and CD-ROMS, and transmission type mediums such as digital and analog communication links, or any signal bearing medium.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

Also, preferred embodiments were described with respect to the HTTP protocol for transmitting documents between computers within a network. However, those skilled in the art will appreciate that the preferred embodiments may apply to any communication protocol for allowing a client to request and access files in a network environment.

In preferred embodiments, the documents or objects ("files") being retrieved were identified by a URL address and may be located on different servers connected over a common network such as the Internet. In alternative embodiments, any file addressing scheme may be used, including a file pathname indicating the location of a file in storage.

Preferred embodiments were described with respect to a browser program for displaying files downloaded from over a network, such as the Internet. However, in alternative embodiments, the browser program may be any viewer program, not just Internet Web browsers, that are capable of accessing and displaying locally files retrieved from a server over a network.

The preferred embodiment has been described with dynamic advertisements (multimedia objects) associated with hyperlinks. This is a common way of displaying dynamic advertisements on a browser. However, there are other ways now (and in the future that may be developed) to display dynamic advertisements or multimedia objects on a browser. In the situation where advertisements are directly displayed in a browser without the aid of a hyperlink embedded within a HTML page that is downloaded by the browser software, the method of the invention can still be applied by various mechanisms. These would comprise identifying and clipping the region associated with dynamic advertisements; saving them over time; optionally associating artificially created identifying tags with these saved entities when needed; and finally displaying them under user control at a later time. Depending on whether the method is performed at the client or server, variations of the method could be used. The essence of the invention is to display dynamic images in a web page under user control. The invention is applicable to all dynamic images regardless of whether or not hyperlinks are associated with the multimedia objects.

A multimedia object can also consist of a separate frame in the same browser that, on a timer, updated its content and linked to the content via the DOM or a scripting language, or any other programmable segment, which dynamically changed an HTML object and its HREF link.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

The invention claimed is:

1. A computer implemented method for displaying, at a client, transient messages received over a network, the method comprising:

capturing, independently of a user action, at different times, a plurality of separate screen images, of only a portion of a display at the client, of a plurality of different multimedia objects each containing at least one transient message and each rendered on the portion of the display at the client;

wherein the different times are determined by a change in content and wherein the change in content is determined by utilizing a document object model of the displayed page to determine the change in content as a triggering event to capture the screen image;

storing each captured screen image of the multimedia object, in a chronological list; and displaying the chronological list with control buttons for enabling a subsequent rendering of the stored captured screen images in a forward and backward succession, at a user configurable rate, in response to a user selection of one of the displayed control buttons, wherein the displayed control buttons are independent of any playback control displayed in conjunction with initially rendering a given multimedia object from which the screen images were captured.

2. A computer implemented method for displaying, at a client, at least one transient message received over a network, the method comprising:

determining a change in content of at least one of a plurality of displayed pages received over a network by utilizing a document object model of the displayed pages to determine the change in content, wherein at least one displayed page contains at least one transient message and is rendered on a portion of a display at the client;

capturing, independently of a user action, a screen image, of only the portion of the display, of each displayed page when it is determined that there is a change in content by utilizing the document object model of the displayed page as a triggering event to capture the screen image;

storing each captured screen image of the displayed pages in a chronological list; and displaying the chronological list with control buttons for enabling a subsequent rendering of the stored captured screen images in a forward and backward succession, at a user configurable rate, in response to a user selection of one of the displayed control buttons, wherein the displayed control buttons are independent of any playback control displayed in conjunction with the displayed page from which the screen images were captured.

3. A computer system having a display for displaying transient messages received over a network, the computer system comprising:

means for capturing, independently of a user action, at different times, a plurality of separate screen images, of only a portion of the display, of a plurality of different multimedia objects each containing at least one transient message and each rendered on the portion of the display;

wherein the different times are determined by a change in content and wherein the change in content is determined by utilizing a document object model of the displayed page to determine the change in content as a triggering event to capture the screen image;

a storage area having each captured screen image of the multimedia objects in a chronological list; and means for displaying the chronological list with control buttons for enabling a subsequent rendering of the stored captured screen images in a forward and backward succession, at a user configurable rate, in response to a user selection of one of the displayed control buttons, wherein the displayed control buttons are independent of any playback control displayed in conjunction with initially rendering a given multimedia object from which the screen images were captured.

4. A computer system having a display for displaying at least one transient message received over a network, the system comprising:

means for determining a change in content of at least one of a plurality of displayed pages received over a network by utilizing a document object model of the displayed pages to determine the change in content, wherein at least one displayed page contains at least one transient message and is rendered on a portion of a display at the client;

means for capturing, independently of a user action, a screen image, of only the portion of the display, of each displayed page when it is determined that there is a change in content by utilizing the document object model of the displayed page as a triggering event to capture the screen image;

a storage area having each captured screen image of the displayed pages in a chronological list; and means for displaying the chronological list with control buttons for enabling a subsequent rendering of the stored captured screen images in a forward and backward succession, at a user configurable rate, in response to a user selection of one of the displayed control buttons, wherein the displayed control buttons are independent of any playback control displayed in conjunction with the displayed page from which the screen images were captured.

5. The system of claim 4 wherein the means for enabling a subsequent rendering further comprises means for redisplaying a sequence of each saved image at a rate predetermined by the user.

6. A computer program, on a computer storage medium, having computer readable program code means for enabling a display of at least one transient message received over a network, the system comprising:

means for determining a change in content of at least one of a plurality of displayed pages received over a network by utilizing a document object model of the displayed pages to determine the change in content, wherein at least one displayed page contains at least one transient message and is rendered on a portion of a display at the client;

means for enabling a capture, independently of a user action, of a screen image, of only the portion of the display, of each displayed page when it is determined that there is a change in content by utilizing the document object model of the displayed page as a triggering event to capture the screen image;

means for storing each captured screen image of the displayed pages in a chronological list; and means for displaying the chronological list with control buttons for enabling a subsequent rendering of the stored captured screen images in a forward and backward succession, at a user configurable rate, in response to a user selection of one of the displayed control buttons, wherein the displayed control buttons are independent of any playback control displayed in conjunction with the displayed page from which the screen images were captured.

* * * * *